3,132,956
ACOUSTICAL TILE, METHODS, AND
COMPOSITIONS
Jesse H. Lewis, Colorado Springs, Colo., assignor to
The Celotex Corporation, Chicago, Ill.
No Drawing. Filed May 31, 1960, Ser. No. 32,557
9 Claims. (Cl. 106—71)

This invention relates to acoustical tile and to compositions suitable for such utilization, methods of making such compositions, and methods of making tile therefrom.

Acoustical tile heretofore available in the art has had serious limitations as to utility to perform satisfactorily, as well as to costs. Of the many acoustical materials available in the prior art, many have low fire-resistance and in some cases constitute an actual fire hazard. Others have low resistance to abrasion and impact; some are not vermin proof; others deteriorate in a moist atmosphere. Few have satisfactory appearance even initially, while some deteriorate in appearance in use.

The formation of an acoustical tile requires a balance between physical properties. Sound absorption is a critical requirement and depends upon porosity which is intimately interconnected with the surface which connect through the face of the material so that incident sound waves can enter into the material and the energy be dissipated by friction internally in the interconnected pores. The porosity must be large for this, and this property is the direct opposite of that needed for strength; e.g., the greater the density, the greater strength obtained. However, a prefabricated acoustical tile must perform both functionally as a sound absorber and as a ceiling. Therefore, it must have enough strength to stand handling; and to be applied on mechanical suspension systems; the surface must be closed enough to provide good appearance and high light reflectance; and it must have great enough porosity for sound absorption. The balance of these properties must be maintained so that all of these factors are taken into consideration.

Among the objects of this invention is acoustical tile solving the problems in the art by having high capacity for sound absorption, of light weight, adequate strength to resist handling and abrasion in application and use, good appearance, resistance to moisture, economy of manufacture, and capability to accept coatings of paint etc., or of glaze, while retaining sound absorption and other desirable properties.

Other objects include compositions usable for making such tile and methods of making such compositions and the production of tile therefrom.

Further objects will appear from the more detailed description set forth below which illustrates the invention but is not limiting, since various changes therein may be made by those skilled in the art within the teaching and scope of this disclosure.

In accordance with this invention, acoustical tile is produced from an expanded mineral aggregate in particulate form bonded together by a fired thin clay coating on the particles which does not fill the voids in the tile so that the voids run interconnectedly throughout the tile. The tile may have a glaze finish which however does not seal the voids. The tile as made in accordance with the present invention gives that balance of properties essential to maximum performance and life.

The mineral aggregate employed is in expanded form and is well exemplified by perlite which will be used to illustrate the invention. Some of the materials which may be substituted in whole or in part for the perlite are vermiculite, expanded clay materials, mineral wool, glass wool, artificially expanded glass particles, ceramic materials with densities in the range produced by burnout techniques, and foamed materials such as foamed glass. The term "expanded" is used here to cover not only expanded perlite pitchstone, obsidian and related materials, but also the "wool" type substances as illustrated above, or other lightweight aggregate produced by various techniques as in burnout operations, foaming, etc. Perlite is used herein to illustrate a prepared aggregate.

The kind and size of particle of the aggregate play an important part in the production of the tile and its properties. The rock type material such as perlite may be treated to produce the desired particle size, by conventional methods. Thus the rock may be crushed to fine particle size and heated at conventional temperatures to obtain the desired expansion. At this stage, the granular expanded material will usually consist of grains of varied sizes. The average sized particles may be separated from the fine and coarser material to obtain a more uniform product preferable for acoustic tile use. Again referring to perlite as illustrative, preferred densities may be about 4 to 15 lbs./cu. ft. and particle size of mostly −4 to +30 or 40 mesh material. The aggregate such as perlite to give the desired balance of physical properties desired, depends upon surface area and particle size distribution of the aggregate.

The expanded aggregate particles illustrated above, are bonded together to give a porous structure as a result of the intercommunicating channels formed in the bonded structure without filling the voids therein which channels permit access from the interior to the exterior of the tile or other formed structure to permit sound to be absorbed.

The selection of the bonding agent is very important since it must have such qualities as a resistance to deterioration when exposed to moisture or to fire.

In accordance with the present invention a thin clay slip is utilized to bond the particles of aggregate such as perlite to give properties important in controlling the ultimate desired characteristics in the finished acoustic product. The clay slip must be of sufficient volume and desirably thin enough to coat each individual particle with a coating on the order of 50 to $300 \times 10^{-7}$ cm. With reference to the viscosity of the slip, a range of from 2750 to 3000 centipoises would be deemed adequate. In general, the viscosity is determined by the amount of deflocculant added. However, the viscosity to some extent is determined by the skill of the person formulating the slip and within limits it is an art. The slip should be of composition and volume to contain enough clay substance to produce adequate bonding strength with minimum filling of pore spaces. This requires controlled viscosity, but the slip must also have a viscosity low enough to permit adequate mixing. Consequently a bond is employed which is a combination of a bentonite type clay with a kaolinite clay. For this reason a strong bond clay such as hector may be used as one of the bond slip ingredients. Other bentonites containing montmorillonite, hectorite, eyrite, illite, or various mixtures of any of these and other plastic materials may be substituted for the hector. The viscosity considerations limit the quantities of bentonite which may be used, since bentonite will act with water to form a viscous element. The balance of the clay materials are supplied as kaolinite type clay. Kaolin, ball clays, native clays, fire clays or bond clays may be used individually or in combination to complete the bond slip. Any of the common ceramic slip ingredients may be included as long as the required dry bonding is achieved and the pore spaces are not filled.

Deflocculants may be used to control viscosity, such deflocculants including for example "Calgon" (sodium hexametaphosphate), sodium silicate, and sodium carbonate and other deflocculants commonly used in this art.

As exemplary of overall proportions desirably employed in producing acoustic tile in accordance with the present invention the following is given.

TABLE I

| Material | Percent by weight | Volume/ cu. in. |
| --- | --- | --- |
| Kaolinite type clay | 13-26 | 2-8 |
| Bentonite type clay | 6-14 | 1-4 |
| Perlite (density 4-15#/cu. ft. size—min. 85%+30 mesh) | 6-80 | 235-370 |
| Water (percent of dry weight) | 100-160 | 36-61 |

The following example illustrates a specific mix to give an acoustical tile.

EXAMPLE I

| Material | Percent by weight | Percent by volume |
| --- | --- | --- |
| Kaolex (plastic Kaolin) | 21 | 2 |
| Hector (hectorite type bentonite) | 10 | 1 |
| Perlite (specific gravity .08 size −4 to +30 mesh) | 69 | 97 |
| Total Solids | 100 | 100 |
| Water (percent of dry weight) | 133 | 16 |
| "Calgon" (defloculant) | .25 | |

The bond slip may be mixed in any common way to produce maximum dispersion of particles and uniformity of composition. The mixing of the bond material is designed to coat the aggregate with the bond material without substantially reducing the aggregate size. Since the aggregates noted are extremely friable, the reduction of aggregate size will produce fine material which may fill the pore space. Therefore, mixing equipment is used which will do this job while limiting the time and intensity below that which would be considered normal intimate mixing in a standard ceramic product. An example of proper mixing would be a Muller Company plaster mixer. In this particular instance mixing time is limited to three minutes. The exact time of mixing will vary for different types of mixers, but in all cases must not be continued long enough to cause significant reduction in aggregate volume. For instance, with a ribbon type mixer the mixing time should preferably be limited to less than two minutes.

The compositions produced as set forth above are pressed into shape to form the acoustical ceramic tile, removed, dried and heat-treated. An advantage of the clay bonding agent for the aggregate is that the clay may be hardened and strengthened at comparatively low temperatures and gradually further hardened when fired to higher temperatures, becoming hard and strong.

The ceramic acoustical tile, should consist of relatively large (up to 5% of the tile thickness) particles which are held together in the dry state by dry bonding strength of the clay substances. When the slip coated particles are pressed together desirably at pressures of 10-60#/sq. in. there is a build up of bonding material at the points of particle contact due to the forming pressure and the surface tension of the slip. In ceramic tile made of these aggregates a fired bond is produced by the normal hardening action of heat on the clay materials. However, it should be noted that some of the aggregates mentioned are of a glassy nature so that a second bonding force is introduced when the aggregate is a glassy material having a lower melting temperature than the bonding clay (see below). A typical example of this is the preferred material perlite. The lowered viscosity of the glass particle encourages reaction between the particles and the bonding material. In this way a vitreous bond is introduced in the clay phase at temperatures far below the temperatures at which a vitreous bond would form if the aggregate were inert. Therefore, the perlite, and other glassy materials, act as a flux as well as a filler, contrary to the usual occurrence in ceramic bodies in which the filler remains inert until it is attacked by the fluxing agents. In this regard the base aggregate material may be limited to those which soften below 1800° F., but which must be such that they will not melt and flow at these temperatures so that the voids are filled, in one sense at least, but not in the complete development. However, this is by far the most important group of raw materials.

A very important point in this whole development is the fact that firing temperatures are below those which are ordinarily considered to be practical for ceramic building materials. This is due both to the requirements defined above where the particles themselves act as a flux due to their softening, and because the surface area of the very thin coating of clay will harden at lower temperatures. Usual temperatures for firing ceramic building materials are in the range 1850-2300° F., whereas in this invention the ceramic acoustic may be fired between 1450° and 1800° F.

Another very important point of this development is the method of cooling. In contrast to the slow, carefully controlled cooling of standard ceramic products, rapid cooling is the preferred method for the acoustical product. A 1" thick ceramic Acousti made by this method may be cooled from maximum temperature to room temperature in about ten minutes. The only limiting factor is the rate at which the air will carry off the heat. The fast cooling produces none of the thermal shock failures associated with standard ceramic products. As a matter of fact, the transverse strength of a given tile composition is at its maximum when cooled by air quenching. This, is believed to be due to the combined effect of the thin bonding and the flux of the material itself, so that there is a freezing reaction between the perlite and the bonding clay when it has reached the desired equilibrium in the firing. As an example of this, following a controlled cycle where cooling takes six hours to cool from firing temperature of 1800° F. to room temperature, a product is obtained with approximately two thirds the transverse strength of that which is air quenched. Specific figures are from 14# transverse strength to 10# transverse on a 3" sample, 10" on span.

In order to improve the appearance of the tile, the surface may be coated with a glaze that leaves the openings therein unfilled. The glaze may be of flowing or crawling type. In order to give the tile appearance of a continuous glazed surface, the glazing process may be begun by coating of the surface of the tile with a flowing glaze having low viscosity when fused, as well as low surface tension. Such flowing glaze of any desired color, penetrates the crevices of the surface of the tile without appreciably narrowing the passagsways or apertures. The glaze may be of any desired color. In this way, no reduction of sound absorption characteristics of the tile results.

Glazes commonly used in the art may be employed such as prepared glass enamels available on the market. Special types of glazes as illustrated hereafter may be used to give better results at lower cost. As illustrative of such special glazes the following compositions are given.

3,132,956

TABLE II

*Glaze Compositions (Empirical Formulae)*

| Glaze No. | K₂O | Na₂O | Li₂O | PbO | CaO | B₂O₃ | Al₂O₃ | SiO₂ | SnO₂ | Fl | TiO₂ |
|---|---|---|---|---|---|---|---|---|---|---|---|
| Runny | .21 | | | .50 | .29 | .40 | .15 | 2.20 | | | |
| IMIT | | [1] 1.269 | .433 | | .298 | .299 | .170 | 1.52 | .114 | .358 | |
| IMIT1 | | [1] 1.269 | .433 | | .298 | .299 | .170 | 1.52 | .114 | | .054 |
| IM2T | | [1] 1.273 | | .425 | .302 | .303 | .173 | 1.54 | .179 | .36 | |
| IM3T | | [1] 1.269 | .433 | | .298 | .299 | .150 | 1.46 | .171 | .358 | |
| IMIT+4 oz. SnO₂ | | [1] 1.269 | .433 | | .298 | .299 | .170 | 1.52 | .228 | | |

[1] Combined K₂O and Na₂O.

These glazes may be mixed from components commonly used in the art to supply such components. For example these compositions may be formulated as follows.

TABLE III

*Glaze Composition (Batch Weights)*

Material:                                   Wt.—percent
  Glaze—                                    of dry wt.
    Frit 501 [1] _____ 52.5–79.1
    Lithium carbonate _____ 0–19.1
    Marble dust _____ 6.7–9.4
    Kaolex D-6 kaolin _____ 2.6–3.6
    Lead carbonate _____ 0–37.9
    Bentonite _____ 0–1.3

Percent of dry
  Opacifiers and coloring agents—           wt. of glaze
    Tin oxide _____ 8–20
    Titanium oxide _____ 0–2

[1] Frit 501 is from American Porcelain Enamel Co. Its batch composition is:

Percent
KNaO _____ 12.86
CaO _____ 3.73
SiO₂ _____ 53.66
B₂O₃ _____ 12.65
Al₂O₃ _____ 8.66
Fl₂ _____ 8.55
                                            ------
                                            100.11

A specific exemplary formulation is given below as Example II, percentages being by weight as is true for all examples in this specification unless otherwise indicated.

EXAMPLE II

*Glaze Composition Glaze IM3T*

Glaze:                                      Percent
  Frit 501 _____ 74.1
  Lithium carbonate _____ 15.1
  Marble dust _____ 9.4
  Bentonite _____ 1.3
                                              ----
                                              99.9

SnO₂ (Glaze IM3T—opacifier) _____ 12.3

Coating and firing techniques commonly used in the art may be employed, but lower firing temperatures are preferable. Thus the IM glazes were fired at a temperature of about 1225° F. except for the IMIT+4 oz. SnO₂ which was fired at about 1250° F. The runny glaze matured at about 1700° F. All of these glazes gave good appearance leaving the pores of the tile open, but the glaze with additional tin oxide showed even better coverage. The "runny" glaze is a typical lead-boro-silicate glaze. For lower firing temperatures, the low firing series of alkaline glaze (IM in Table II) were prepared. The alkaline glazes were whiter than the low temperature lead glazes. The IMIT glazes were considered best, and as indicated may be further modified by the addition of further quantities of tin oxide.

The glazing of the tile does not offer any great difficulties particularly in the production of glossy or semi-glossy surfaces. However, even a glossy glaze applied to the perlite tile does not present a reflective surface as a general rule due to surface irregularities.

Having thus set forth the invention, what is claimed is:

1. A porous acoustical tile consisting essentially of an expanded mineral aggregate in particulate form bonded together by a fired thin clay coating on the particles leaving interconnected voids in the tile, the clay coating including bentonite group and kaolinite group clays in which tile the proportions by weight are approximately from about 60 to 80% perlite, 13 to 26% kaolinite group clay, and 6 to 14% bentonite group clay.

2. A porous glazed acoustical tile consisting essentially of expanded mineral aggregate in particulate form bonded together by a fired thin clay coating on the particles leaving interconnected voids in the tile, the clay coating including bentonite group and kaolinite group clays in which tile the proportions by weight are approximately from about 60 to 80% perlite, 13 to 26% kaolinite group clay and 6 to 14% bentonite group clay and a lead-borosilicate runny glaze fused over at least one surface thereof.

3. The method of making acoustical tile which comprises subjecting a shaped wet acoustical-tile composition of expanded mineral aggregate in particulate form carrying a thin aqueous clay coating on the particles the clay including bentonite group and kaolinite group clays, to firing at a temperature below that of fusion of the coating but sufficient to bond the particles together leaving interconnected voids in the fired tile, the proportions by weight being from about 60 to 80% perlite, 13 to 26% kaolinite group clay, 6 to 14% bentonite group clay, and from about 100 to 160% on the dry weight of the composition, of water, the firing temperature being from about 1450° F. to about 1800° F.

4. The method of claim 3 in which the fired tile is air cooled to room temperature in about 10 minutes after firing.

5. A composition for making acoustical tile consisting essentially of an expanded mineral aggregate in particulate form carrying a thin clay coating on the particle the clay including bentonite group and kaolinite type clays in which composition the proportions by weight are from about 60 to 80% perlite, 13 to 26% kaolinite group clay, 6 to 14% bentonite group clay.

6. The method of making compositions for production of acoustical tile which consisting essentially of mixing an expanded mineral aggregate in particulate form with a thin aqueous clay coating composition including bentonite group and kaolinite group clays for a short period of time to give a thin clay coating on the particles without substantial reduction in particle size, the particles of the aggregate being of a size of from —4 to 40 mesh, and a coating is formed on the particles of about 50 to 300×10⁻⁷ cm.

7. The method of making compositions for production of acoustical tile which comprisese mixing an expanded mineral aggregate in particulate form with a thin aqueous clay coating composition including bentonite group and kaolinite group clays for a short period of time to give a thin clay coating on the particles without substantial reduction in particle size, the proportions by weight are from about 60 to 80% perlite, 13 to 26% kaolinite group clay, 6 to 14% bentonite group clay, and 100 to 160% on the dry weight of the composition, of water.

8. A porous acoustical tile consisting essentially of expanded mineral aggregate in particulate form bonded together by a fired thin clay coating on the particles leaving interconnected voids in the tile, the clay coating including bentonite group and kaolinite group clays in which tile the proportions by weight are approximately from about 60 to 80% perlite, 13 to 26% kaolinite group clay, and 6 to 14% bentonite group clay, and in which the coating is of a thickness of about 50 to $300 \times 10^{-7}$ cm.

9. A porous acoustical tile consisting essentially of expanded mineral aggregate in particulate form bonded together by a fired thin clay coating on the particles leaving interconnected voids in the tile, the clay coating including bentonite group and kaolinite group clays in which tile the proportions by weight are approximately from about 60 to 80% perlite, 13 to 26% kaolinite group clay, and 6 to 14% bentonite group clay, and in which a minor amount of a deflocculant is included.

References Cited in the file of this patent

UNITED STATES PATENTS

| | | |
|---|---|---|
| 1,927,102 | Sucetti et al. | Sept. 19, 1933 |
| 2,878,131 | Houston et al. | Mar. 17, 1959 |
| 2,976,162 | Ekdahl | Mar. 21, 1961 |
| 3,030,218 | Robinson | Apr. 17, 1962 |

FOREIGN PATENTS

| | | |
|---|---|---|
| 558,901 | Canada | June 17, 1958 |